(12) United States Patent
Sasaki et al.

(10) Patent No.: US 6,919,896 B2
(45) Date of Patent: Jul. 19, 2005

(54) SYSTEM AND METHOD OF OPTIMIZING GRAPHICS PROCESSING

(75) Inventors: Nobuo Sasaki, Tokyo (JP); Takeshi Yamazaki, Austin, TX (US)

(73) Assignee: Sony Computer Entertainment Inc. (JP)

( * ) Notice: Subject to any disclaimer, the term of this patent is extended or adjusted under 35 U.S.C. 154(b) by 8 days.

(21) Appl. No.: 10/095,213

(22) Filed: Mar. 11, 2002

(65) Prior Publication Data

US 2003/0169269 A1 Sep. 11, 2003

(51) Int. Cl.⁷ .............................................. G06F 15/80
(52) U.S. Cl. ...................... 345/505; 345/506; 345/531; 345/536; 345/581; 709/248; 709/400
(58) Field of Search ................................ 345/531, 536, 345/581, 505, 506; 709/248, 400

(56) References Cited

U.S. PATENT DOCUMENTS

| | | | | |
|---|---|---|---|---|
| 4,967,375 A | * | 10/1990 | Pelham et al. | 364/518 |
| 5,081,575 A | | 1/1992 | Hiller et al. | |
| 5,408,606 A | * | 4/1995 | Eckart | 345/505 |
| 5,574,847 A | | 11/1996 | Eckart et al. | |
| 6,191,800 B1 | | 2/2001 | Arenburg | |
| 2001/0008847 A1 | * | 7/2001 | Miyamoto et al. | 463/33 |

FOREIGN PATENT DOCUMENTS

WO    WO 99/41704 A    8/1999

OTHER PUBLICATIONS

Polygon Rendering for Interactive Visualization on Multi-computers, David Allan Ellsworth, A Dissertation submitted to the faculty of the University of North Carolina at Chapel Hill, Chapel Hill, 1996.

Customising Graphics Applications: Techniques And Programming Interface, Henry Styles and Wayne Luk, Department of Computing, Imperial College, London England.

Annex to Form PCT/ISA/206, Communication Relating To The Results Of The Partial International Search.

Molnar S et al.: "A Sorting Classification Of Parallel Rendering" IEEE Computer Graphics And Applications, IEEE Inc. New York, US, pp. 23–32, XP000509477, ISSN: 0272–1716 (the whole document).

International Search Report, dated Sep. 2, 2004.

* cited by examiner

*Primary Examiner*—Matthew C. Bella
*Assistant Examiner*—Tam Tran
(74) *Attorney, Agent, or Firm*—Lerner, David, Littenberg, Krumholz & Mentlik, LLP

(57) ABSTRACT

A method and system for optimizing the processing of graphics is disclosed. The system may comprise at least one geometry processor and at least one graphics processor. A communication channel permits communication between the geometry and graphics processors. A control processor may communicate with the geometry and graphics processor through the communications channel. A method of processing graphics data in a computer system is provided to determine whether the geometry and graphics processors are being efficiently utilized. If necessary, one or more of the geometry and graphics processors are selectively assigned or unassigned to improve the efficiency of the graphics processing circuitry in performing the graphics task.

37 Claims, 9 Drawing Sheets

SYSTEM AND METHOD OF OPTIMIZING GRAPHICS PROCESSING

BACKGROUND OF THE INVENTION

The present invention relates to a method optimizing graphics processing in general, and in particular, a method of optimizing graphics processing for a multiprocessor system.

It is common for current computer systems to generate graphics images. This is specialized and computationally expensive procedure. Therefore, many computer systems utilize specialized hardware to perform varying parts of the graphics processing. FIG. 1 shows one example of such a current system. A main processor 100 is a general purpose processor. Geometry processor 102 is a specialized subprocessor within main processor 100 for performing the common transforms necessary to convert a three-dimensional image to a two-dimensional image while taking into account such issues as perspective. Such a geometry processor can be used for other common three-dimensional graphics calculations. Geometry processor 102 may also be separate from main processor 100, or can be executed as a software program on main processor 100. The final result from geometry processor 102 is a display list which contains information necessary for creating a graphic figure. Typically, the display list will contain the information for creating a polygon. A triangle is often a polygon, but other polygons are possible. The display list will contain the type of polygon represented, as well as the information necessary to generate that polygon. In this case, the triangle will be indicated, and information about each of the vertices of the triangle will also be included in the display list.

Bus 104 is a communications channel between geometry processor 102 and graphics processor 106. Graphics processor 106 is a specialized circuit for rendering display lists. Graphics processor 106 will include multiple subcircuits. Input buffer 108 buffers the display lists. Digital differential analyzer 112 (hereafter "DDA 112") calculates the lines in between the vertices of the polygon. DDA 112 includes a DDA set-up engine. Pixel processor 114 performs multiple functions. Primary, it calculates the final RGB value of each pixel within the polygon. This step is referred to as rendering. Within the processing of rendering a polygon, pixel processor 114 will perform the step of texturing. Part of the determination of the RGB of a pixel will depend on a texture that has been chosen for that particular polygon. This texture, in the form of a texture map, is applied by the pixel processor 114 to the polygon. Frame buffer 116 is a dynamic random access memory, or DRAM, which accumulates the frame reconstructed out of polygons until an entire frame or field (in the case of double buffering) is generated. That frame is then passed through bus 118 to a digital to analog converter, and eventually, to a monitor. Frame buffer 116 will receive data from the pixel processor 114, but the pixel processor 114 also acts as frame buffer 116. A texture buffer 118 and a DRAM frame buffer 120 may be located either in the pixel processor 114, the frame buffer 116, or independent of either. The pixel processor will generally read and write to these buffers, and when necessary, these buffers are updated from the frame buffer 116.

Several problems, in terms of computational efficiency, using the above-described apparatus can occur when one is attempting to render an entire frame. For example, when rendering a scene from a game, the game will have a background of lesser detail, a midground of greater detail, and a foreground of greatest detail. The two extremes, the background and the foreground, create two different cases. In the first case, a small number of very large polygons are used to generate a background figure. In the second case, a large number of small polygons are used to generate a detailed foreground figure. Each of these two cases has different problems.

Processing the background of a frame in the first case requires processing a small number of large polygons. The amount of processing time required for a geometry transformation is dependent on the number of vertices to be processed. Therefore, the amount of processing time necessary for the geometry processor 102 to process the background polygons will be relatively short. However, the graphics processor 106 will have multiple problems with the large polygons. First, the geometry processor will issue display lists much faster than the graphics processor 106 will be able to render the large size polygons. Thus, the geometry processor will have to remain idle while the graphics processor 106 catches up. Other bottlenecks occur within the graphics processor 106 when processing large polygons besides the slower speed of rendering. A large polygon will cover a large area of a texture map. If this area is much larger than the size of the texture buffer 118, a "texture miss" will often occur. Pixel processor 114 will remain idle while texture buffer 118 is updated by the texture map within the frame buffer so that the appropriate textures can be applied to that portion of a polygon. Further, a large polygon will cover many DRAM pages. When the rendering of a polygon reaches the end of a DRAM page, a "DRAM page break" occurs. DRAM page buffer 120 must place its contents back within the frame buffer and the new page must be updated from the frame buffer to the DRAM page buffer. Pixel processor 114 will remain idle during this process. Such a page break will occur frequently with a large polygon, as the size of the polygon may be many times larger than the size of the DRAM page buffer, thus causing a DRAM page break multiple times for every rendering pass. Thus, a small number of large polygons have a number of sources of slowdowns in processing at the point of the graphics processor.

FIG. 2 shows the result of the graphics processor and geometry processor pipeline attempting to process a small number of large polygons. The graphics processor is able to process a polygon or other graphic object within a certain time at the available computational power, or less. The bar 202 shows the amount of computational time needed to process a background polygon or other object at the geometry processors' processing speed for the given task. Graphics processor 106 is represented by bar 204. Shaded bar 206 shows the amount of computational time needed to process the background polygon beyond the computational time available. FIG. 2 clearly shows that geometry processor 102 will remain idle while graphics processor 106 catches up in the amount of time shown by the shaded bar 206. Thus, the graphics processor will act as a bottleneck.

In the second, opposite case, a large number of small polygons need to be processed and rendered. This creates a different bottleneck. A large number of small polygons provides a much larger number of vertices. Thus, geometry processing will take substantially longer than in the case discussed above. FIG. 3 illustrates this. Bar 302 illustrates the amount of computational time needed to process a foreground polygon or other graphic object at the geometry processor's processing speed. Shaded bar 304 shows the amount of extra time the geometry processor will have to compute in order to "catch up" with the graphics processor. Graphics processor 106 will be able to render the foreground polygons much more quickly than in the first case. This is both because each polygon will have a smaller number of pixels to render, and that the small size of the polygons will decrease the likelihood of a DRAM page break or a texture miss. This increased processing speed is seen in bar 306 which illustrates the decreased amount of computational time the rendered of the large number of small polygons requires. Again, shaded bar 304 represents the amount of time the graphics processor 106 will have to remain idle while geometry processor 102 processing its computational background. Thus, in the second case, the geometry processor acts as a bottleneck.

The above problems are exacerbated by the continuing push to use higher resolution graphics such as qualified rendered pictures. Such pictures are drawn at such high resolution that the polygon lines are not visible and smooth curves result.

FIG. 4 shows a third case which is the computationally optimum case. In the case shown, geometry processor 102 is shown by bar 402 to process all of its display lists within a given time. Graphics processor 106 is shown by bar 404 to process and render all of its polygons in an equal amount of time. Thus, there is no bottleneck to the geometry processor-graphics processor pipeline. This is a load balanced condition.

New architectures of computer systems will include multiple geometry processors and multiple graphics processors. The advent of such apparatuses permits new ways of dealing with the above described problems and other problems arising from such multiprocessor systems.

SUMMARY OF THE INVENTION

One aspect of the present invention is a method of optimizing the processing of graphics. A preferred method includes the step of assigning a first number of geometry processors to perform at least a first portion of a graphics task and a second number of graphics processors to perform at least a second portion of a graphics task. The quantity of the first number of geometry processors may be the same or different from the quantity of the second number of graphics processors. Performance data is preferably collected from the second number of graphics processors over a period of time, and the collected performance data may be analyzed with an algorithm. Another step in the preferred method is changing at least one of the first number of geometry processors assigned to the graphics task and the second number of graphics processors assigned to the graphics task depending on the analyzed results of the collected performance data.

Another preferred method also includes the step of assigning a first number of geometry processors to a graphics task and a second number of graphics processors to a graphics task. In a preferred embodiment, the portion of the graphics task performed by the first number of geometry processors comprises transforming object data into vertex data of polygons, while the portion of the graphics test performed by the second number of graphics processors comprises rendering the polygons into a buffer memory. The rendered polygons may comprise a plurality of pixels. The method may also comprise collecting performance data from the second number of graphics processors over a period of time, and then analyzing the collected performance data with an algorithm. It is preferable for the method to comprise increasing the number of polygons and decreasing the average size of polygons generated by the first number of geometry processors by increasing the tessellation of the graphical objects to be rendered depending on the results of analyzing the collected performance data.

Another preferred method includes the step of assigning a first number of geometry processors to a graphics task and a second number of graphics processors to a graphics task. Preferably the geometry and graphics processors perform different portions of the graphics task, which includes creating polygons (e.g., transforming object data into polygon vertex data and rendering polygons in a buffer memory. Performance data is preferably collected from the second number of graphics processors over a period of time, and the collected performance data may be analyzed with an algorithm. The method may also comprise decreasing the first number of polygons and increasing the average size of polygons generated by the number of geometry processors by decreasing the tessellation of the surfaces to be generated depending on the results of analyzing the collected performance data.

Yet another preferred method also includes the step of assigning a first number of geometry processors to a graphics task and a second number of graphics processors to a graphics task. Preferably, the first number of geometry processors perform a first portion of the graphics task and the second number of graphics processors perform a second portion of the graphics task. The geometry processors may transform three-dimensional object data into vertex data of polygons including x, y and z coordinates. The geometry processor also create vertex data of polygons in only x and y coordinates in cases where no z coordinate exists or is unnecessary. The graphics processor may be used to render the polygons into a buffer memory. Performance data may be collected from the second number of graphics processors over a period of time, and may be analyzed with an algorithm. The method may also comprise changing at least one of the first number of geometry processors assigned to the graphics task, the second number of graphics processors assigned to the graphics task, and the amount of tessellation applied to graphics objects by the first number of geometry processors.

Another preferred method of optimizing the processing of graphics includes the step of assigning a first number of geometry processors to a graphics task and a second number of graphics processors to a graphics task. Performance data is collected from the second number of graphics processors over a period of time, and is then analyzed with an algorithm. The method may then spatially sort the polygons processed by the first number of geometry processors before the polygon data is sent to be the graphics processors.

Another preferred method of processing graphics data in a computer system having graphics processing circuitry comprises utilizing at least one geometry processor to perform at least a portion of a graphics task and utilizing at least one graphics processor to perform at least another portion of the graphics task. The preferred method also comprises determining whether the at least one geometry and graphics processors are being efficiently utilized; and if necessary, selectively assigning or unassigning one or more of the geometry and graphics processors to improve the efficiency of the graphics processing circuitry in performing the graphics task.

It is preferable for the step of utilizing at least one geometry processor to perform at least a portion of the graphics task to comprise performing 3-D to 2-D conversion of an object into vertex data of polygons. It is also preferable for the step of utilizing at least one graphics processor to perform at least another portion of the graphics task to comprise rendering of the polygon vertex data into a buffer memory.

The polygons preferably comprise a plurality of pixels. The step of determining whether the at least one geometry processor and the at least one graphics processor are being efficiently utilized may comprise calculating the quantity and average size of the polygons that are rendered. In accordance with a preferred method, the step of calculating the average size of the rendered polygons comprises counting the quantity of pixels rendered and dividing by the quantity of polygons rendered.

It is also preferable for the method to comprise providing a set of buffers, a first cross-bar channel connecting the plurality of geometry processors to the set of buffers and providing a second cross-bar channel connecting the plurality of graphics processors to the set of buffers. The set of buffers may have an initial configuration and the first and second cross-bar channels may also have initial configurations.

It is preferable for the step of selectively assigning or unassigning one or more of the geometry and graphics processors to comprise calculating a new configuration for the first cross-bar channel, calculating a new configuration for the set of buffers in calculating a new configuration for the second cross-bar channel. The set of buffers and the first and second cross-bar channels may then be reconfigured to obtain new configurations.

Another aspect of the present invention relates to a computer system having graphics processing circuitry for processing graphics data. Preferably, the computer system comprises at least one geometry processor for at least partially performing at least a portion of a graphics task. At least one graphics processor is also provided for at least partially performing at least another portion of the graphics task. A communication channel is also provided for permitting communication between the at least one geometry and graphics processors. A control processor is arranged to communicate with the geometry and graphics processors through the communication channel. The control processor preferably determines whether the at least one geometry and graphics processors are being efficiently utilized and, if necessary, will selectively assign or unassign one or more of the geometry and graphics processors to improve the efficiency of the graphics processing circuitry in performing the graphics task.

In a preferred embodiment, the at least one geometry processor comprises a plurality of geometry processors and the at least one graphics processor comprises a plurality of graphics processors. Preferably, the plurality of geometry processors performed 3-D to 2-D conversion of any object into vertex data of polygons. It is also preferable for the plurality of graphics processors to be used to render the polygons into a buffer memory. The polygons may comprise the plurality of pixels.

The communication channel preferably comprises a first channel having a cross-bar architecture, at least one buffer memory connected to receive data from the plurality of geometry processors through the first channel and a second channel having a one-to-one cross-bar architecture arranged to permit communication between the plurality of graphics processors and the at least one buffer memory.

In a preferred embodiment, the communication channel facilitates communication of performance data from the plurality of graphics to the control processor.

The above features and advantages of the present invention will be better understood when considered in view of the following detailed description of the preferred embodiments and accompanying drawings.

DETAILED DESCRIPTION

Figure 5:
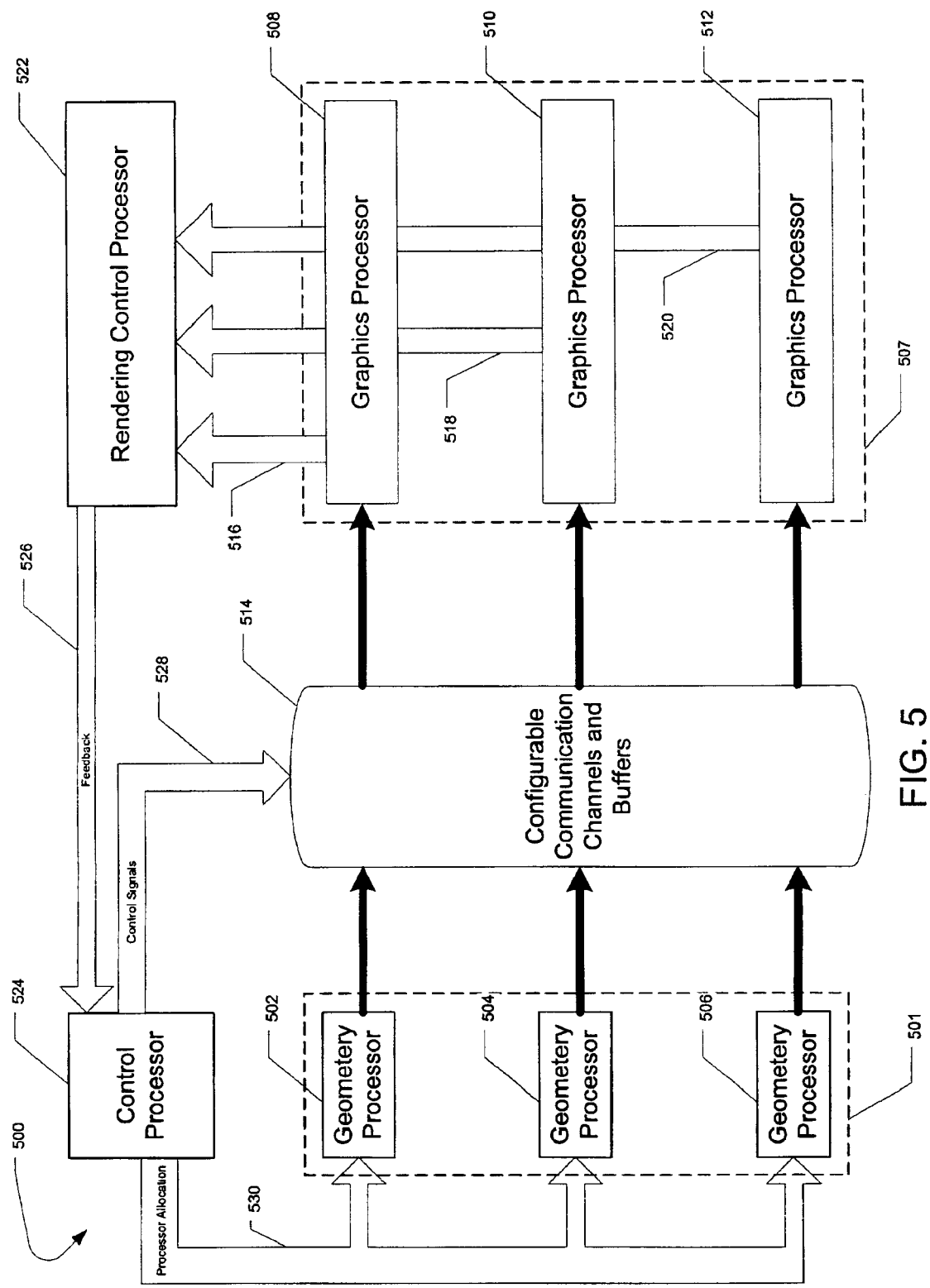
FIG. 5 is a diagram of the present graphics processing apparatus.

FIG. 5 illustrates a graphics processing apparatus 500 in which optimization of graphics processing may occur. The number of geometry processors 501 may include geometry processors 502, 504 and 506, which are similar to geometry processor 102. The number of graphics processors 507 may include graphics processors 508, 510 and 512 are similar to graphics processor 106. Geometry processor 502, 504 and 506 are connected to graphics processors 508, 510 and 512 by configurable communication channels and buffers 514. Configurable communication channels and buffers 514 allow each and every geometry processor to send data to each and every graphics processor in graphics apparatus 500. Graphics processors 508, 510 and 512 each have communications channels 516, 518 and 520 connecting communicatably to rendering control processor 522. Communications channels to 516, 518 and 520 carry performance data from graphics processors 508, 510 and 512 to rendering control processor 522. The two sets of processors are not linked in a predetermined set of pipelines. The rendering control processor is connected to control processor 524 by a feedback channel 526. Control processor 524 is operationally connected to geometry processors 502, 504 and 506 by the processor allocation channels 530. Control processor 524 is also operationally connected to configurable communication channels and buffers 514 by control signal channel 528.

In operation, defined 3-D objects are passed to the geometry processors 502, 504 and 506 to be converted into 2-D display lists of graphics primitives. The display lists are then passed to graphics processors 508, 510 and 512 through configurable communication channels and buffers 514. The solid black arrows of FIG. 5 show this transfer of data. Graphics Processors 508, 510 and 512 render the 2-D display lists of graphics primitives, and may both apply texture and shading while rendering, or in later passes (see FIG. 8). A graphics task may be considered the conversion of a defined 3-D object or objects into a displayable pixel map in a frame buffer. "Conversion" may include the transformation of a 3-D object into a display list of vertex data of polygons and the subsequent rendering of that data into a pixel matter.

Figure 8:
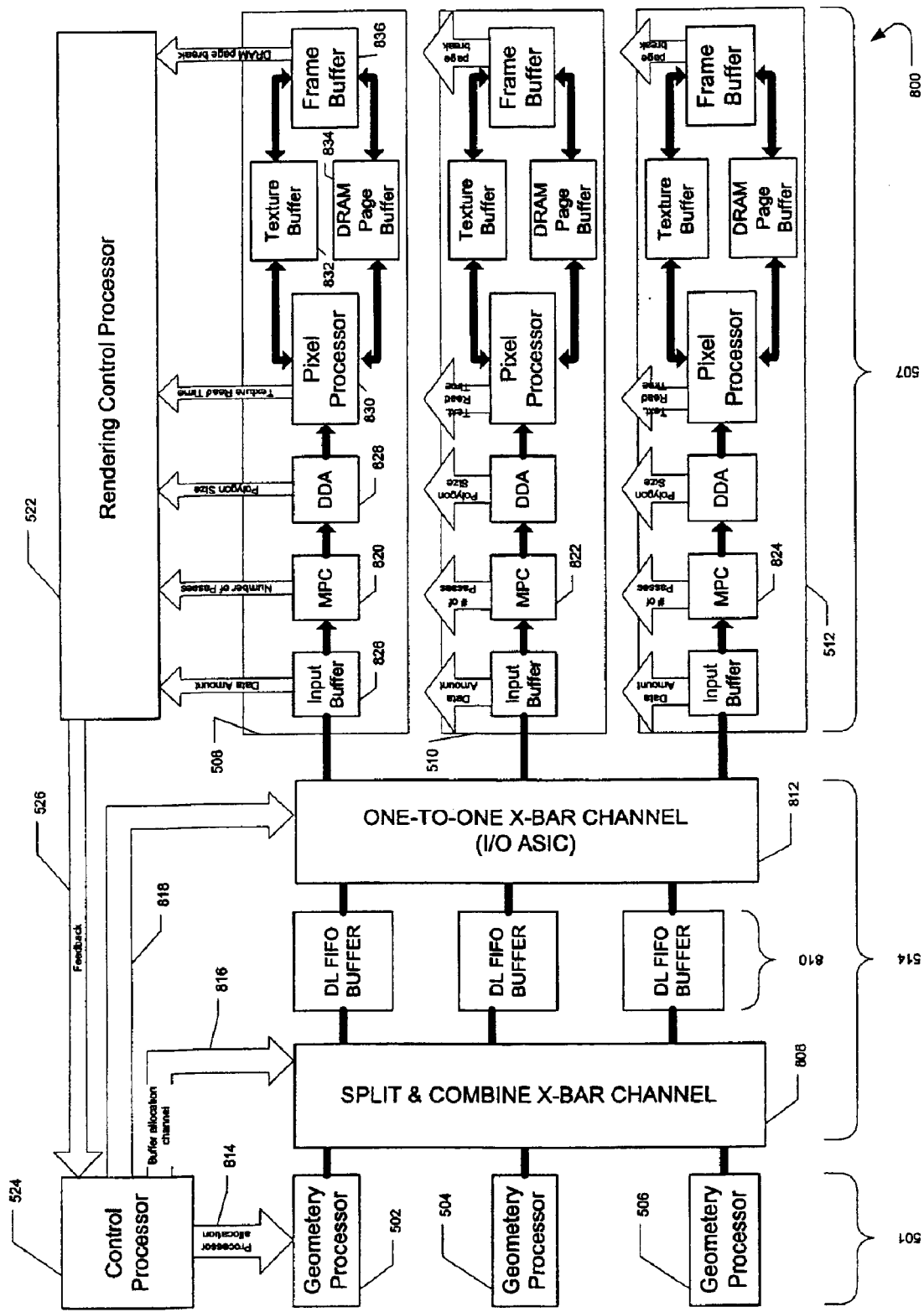
FIG. 8 is a more detailed diagram of one embodiment of the graphics processing apparatus.

Graphics processors 508, 510 and 512 pass performance data to rendering control processor 522 by communication channels 516, 518 and 520. This performance data is processed within the rendering control processor 522. The results are sent on feedback channel 526. This feedback can take the form of either high level performance data and/or specific commands to be executed by the control processor 524. Control processor 524 then takes the feedback data from rendering control processor 522 and uses it to perform processor allocation and configuration of the configurable communication channels and buffers 514. Note that in FIG. 5 the non-solid arrows represent control signals rather than data signals. FIG. 8 shows a more detailed embodiment of the graphics processor apparatus 500 shown in FIG. 5. In one embodiment, the rendering control processor 522 and the control processor 524 are a single logical control processor. In another embodiment, the control processor 524 and the rendering control processor 522 are logically distinct processors on a single integrated circuit. In another embodiment, control processor 524 and rendering control processor 522 are on separate integrated circuits. In yet another embodiment, the rendering control processor 522 acts as a mere "conduit" for the data past through communication channels 516, 518 and 520, and control processor 524 performs all analysis and controls functions. In yet another embodiment, the rendering control processor 522 performs the majority of the analysis and control decisions and sends them by feedback channel 526 to the control processor 524, which acts a mere conduit for those commands.

In one embodiment, geometry processors 502, 504, 506 may be sub-processors of a main processor that are dynamically dedicated to specific tasks such as geometry transformation. In another embodiment geometry processors 502, 504, 506 are separate general purpose processors which are dynamically allocated to geometry transformation. In another embodiment, geometry processors 502, 504, 506 are specialized processors for such geometry transform operations. Such specialized processors could either be within a main processor or be separate processors. Geometry processor 502, 504 and 506 need not be of the same type. For example, geometry processor 502 may be a sub-processor, whereas geometry processor 504 may be a separate processor performing geometry transformations.

Graphics processing apparatus 500 is shown with three geometry processors. Graphics processing apparatus 500 may have any plurality of geometry processors. In a preferred embodiment, eight geometry processors. Regardless of the particular implementation or configuration, the number of geometry processors 501 is the number of discrete logical processing units performing geometry transformations and the like for a graphics task at a given time.

Graphics processing apparatus 500 is shown with e three graphics processors 508, 510, and 512. Graphics processing apparatus 500 may have any plurality of graphics processors. In a preferred embodiment, eight graphics processors are used. In a preferred embodiment, each graphics processor 508, 510 and 512 is on a different integrated circuit. In an alternative embodiment, two or more of graphics processors 502, 504 and 506 are on a single integrated circuit. Regardless of the particulars of configuration and implementation, the number of graphics processors 507 is the number of discrete logical processing elements performing rendering and other related computations for a graphics task at a given time.

There does not need to be an equal number of geometry processors 501 and number of graphics processors 507. This flexible architecture allows different numbers of geometry processors and graphics processors.

Figure 6A:
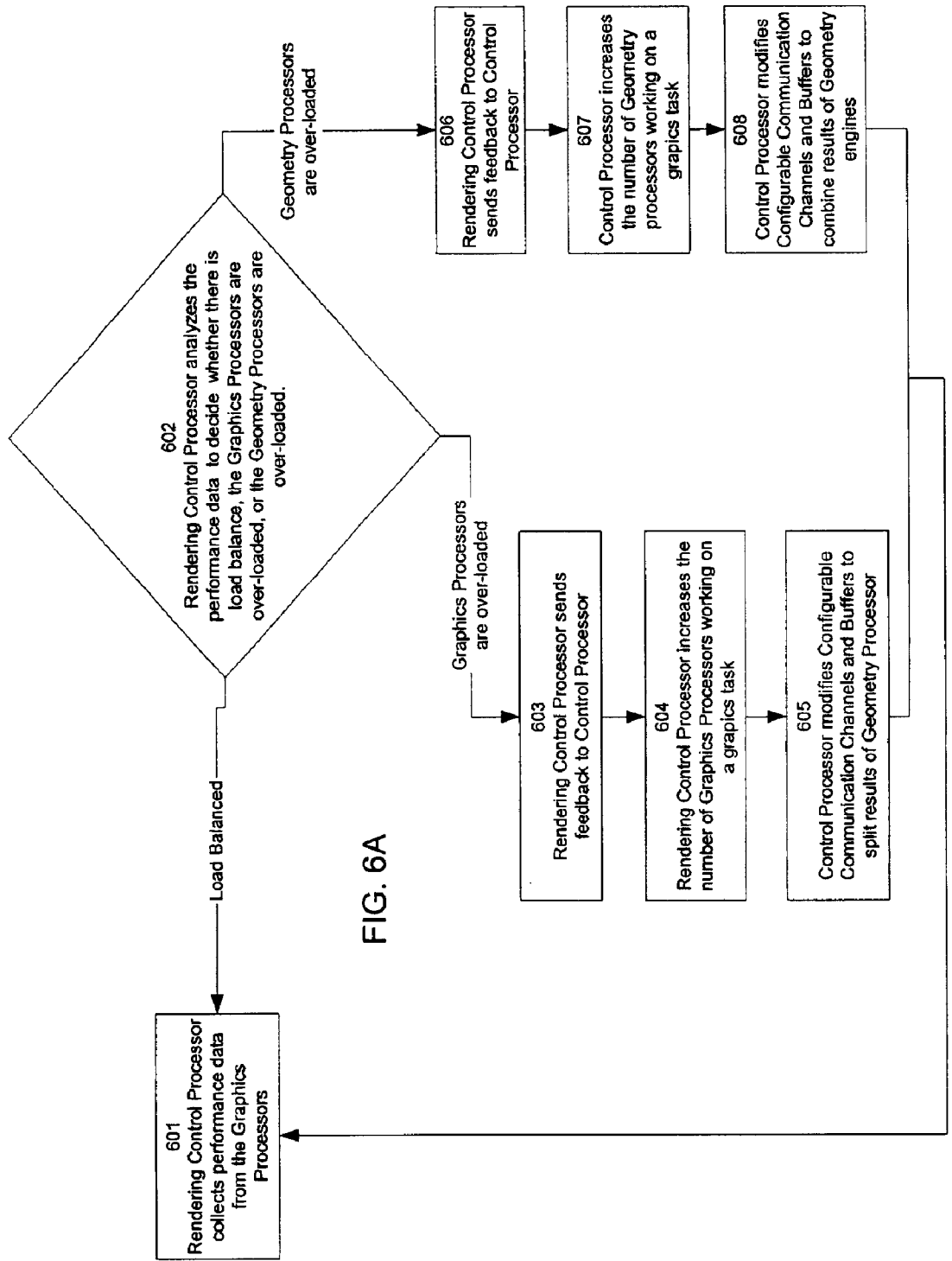
FIG. 6 is a flow chart of an embodiment of the present invention.

FIG. 6A shows a flow chart of one embodiment of the current invention. The method shown in FIG. 6A shows how graphics processing apparatus 500 as shown in FIG. 5 may be optimized to achieve load balancing by taking advantage of the multiple geometry processors and graphics processors available. By taking advantage of the configurable communications channels and buffers 514, applying more than one geometry processor or graphics processor to the drawing and rendering of a polygon or to a graphics task avoids the bottlenecks of the prior art. The method of FIG. 6A may be termed configuration load balancing.

In step 601, the Rendering Control Processor 522 collects performance data from the number of graphics processors 501. In step 602, the Rendering Control Processor analyses the performance data. The collecting of performance data by the Rendering Control Processor 522 occurs over a period of time. In a preferred embodiment, this period of time is on the order of 10,000 clock cycles. Obviously, however, almost any different period of time may be applied. However, the configuration load balancing is a statistical process, and as such, the period of time must be great enough to collect a statistically significant set of data.

The analysis of this performance data 602 includes the determination of whether the number of Graphics Processors 507 is overloaded, or the number of Geometry Processors 501 is overloaded, or if the number of Geometry Processors 507 and the number of Graphics Processors 507 are load balanced. If the analysis of the performance data step 602 finds the number of Graphics Processors 507 load balanced with the number of Geometry Processors 501, step 601 is again implemented for a period of time.

However, if the computational load on the number of Graphics Processors 507 is an overload, the Rendering Control Processor 522 sends feedback to the Control Processor 524 in step 603. In step 604, Control Processor 524 increases the number of Graphics Processors working on a set of graphics tasks after determining the number of graphics processors to add. In the next step, step 605, control processor 524 modifies configurable communication channels and buffers 514 after determining the configuration. The display list results of a geometry processor are broken up and sent to more than one graphics processor, thus increasing the number of graphics processors working on the problem. By splitting up the rendering of the large polygons between more graphics processors, the computational load is shared between graphics processors. The total amount of time to perform the rendering within the graphics processors is reduced. Thus, the geometry processors have to remain idle for less time.

Figure 3:
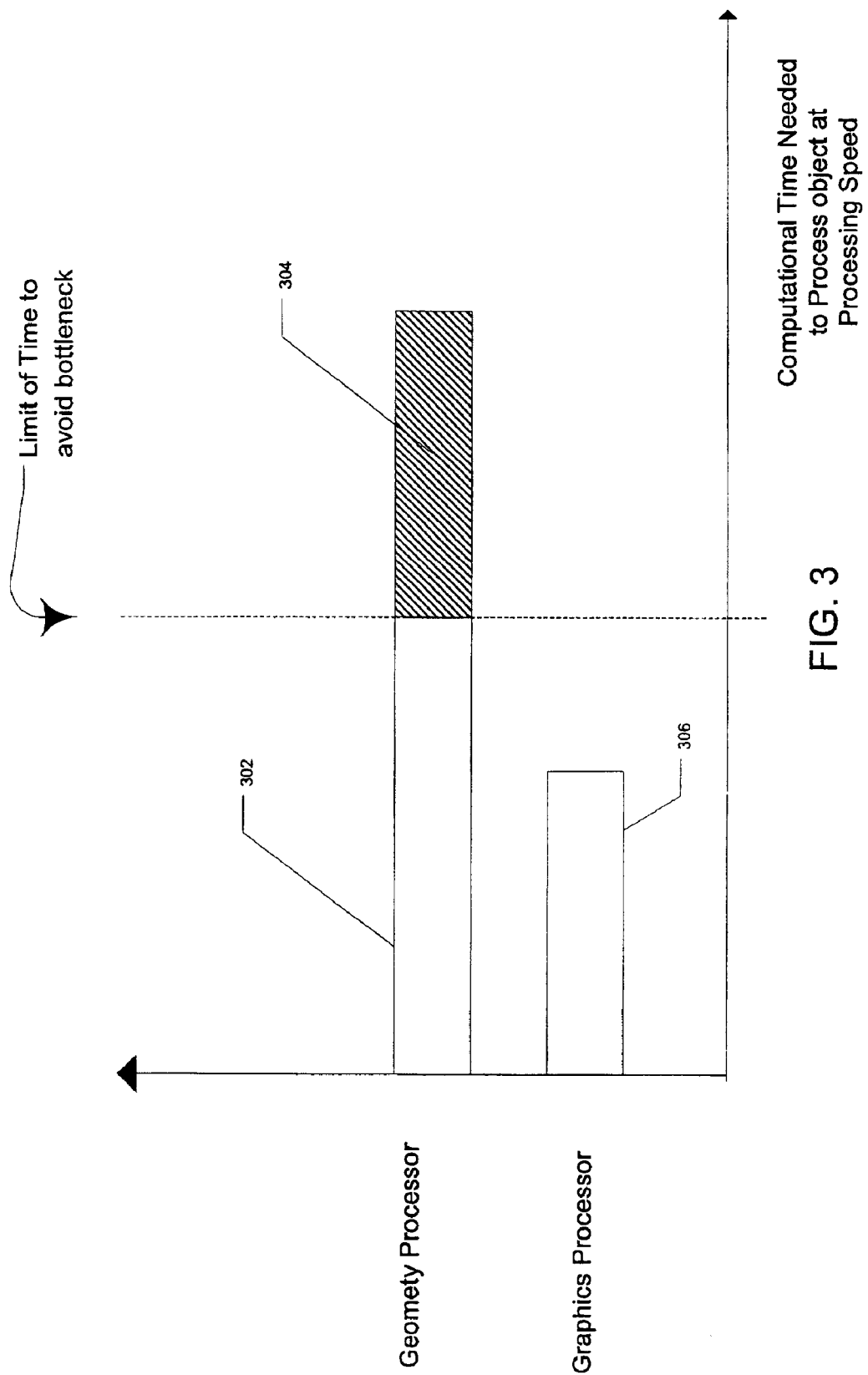
FIG. 3 is a graph of the computational load of the prior graphics processing apparatus under another situation.
Figure 4:
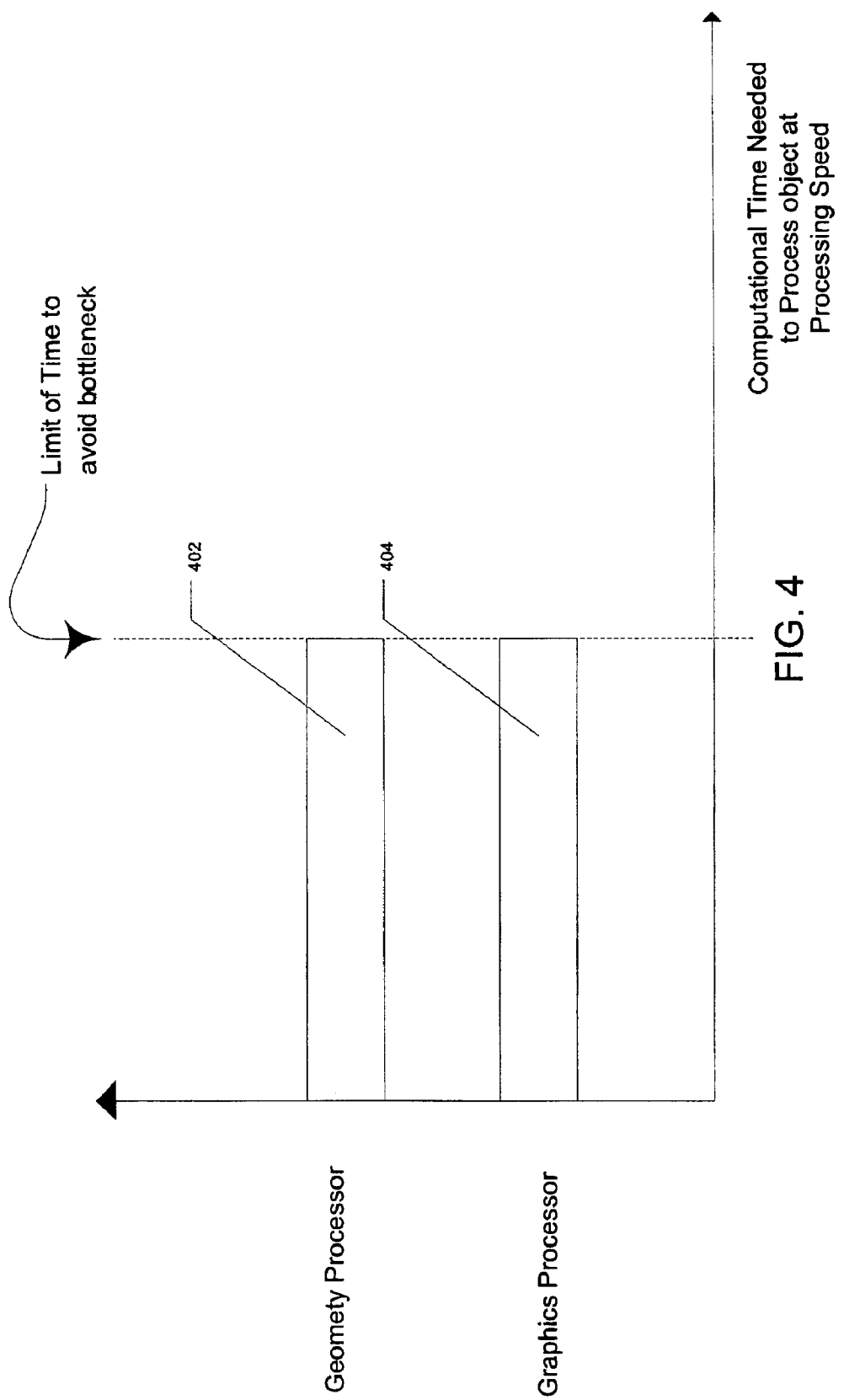
FIG. 4 is a graph of the computational load of the prior graphics processing apparatus under a load balanced condition.

If the geometry processors' computational load is an overload as determined in step 602, the next step is step 606. An example of this case would be rendering a large number of small polygons. This leads to the problems as shown in FIG. 3. To address these problems, in step 606, the rendering control processor sends the appropriate feedback information to the control processor 524. In step 607, the control processor 524 increases the number of geometry processors working a graphics task, after determining how many geometry processors to add. Thus, the computational work in shared among a number of geometry processors. In step 608, control processor 524 modifies the configurable communication channels and buffers 514 to create display list buffers with the output of the multiple geometry processors going into a single display list buffer, after determining the new configuration. This display list buffer is a FIFO buffer, or First In/First Out buffer. This allows the serialization of the display list, which allows it to then be processed by a single graphics processor.

Thus, depending on the branch determined in step 602, the number of graphics processors working on an object, or the number of geometry processors working on an object, is increased. Thus, load balancing can be achieved. A feedback loop is established in which the performance data is constantly monitored in step 601 by the rendering control processor 522. Thus, if the objects which need to be rendered are changed, the feedback loop automatically adjusts the distribution of the computational load necessary to draw the object.

Figure 6B:
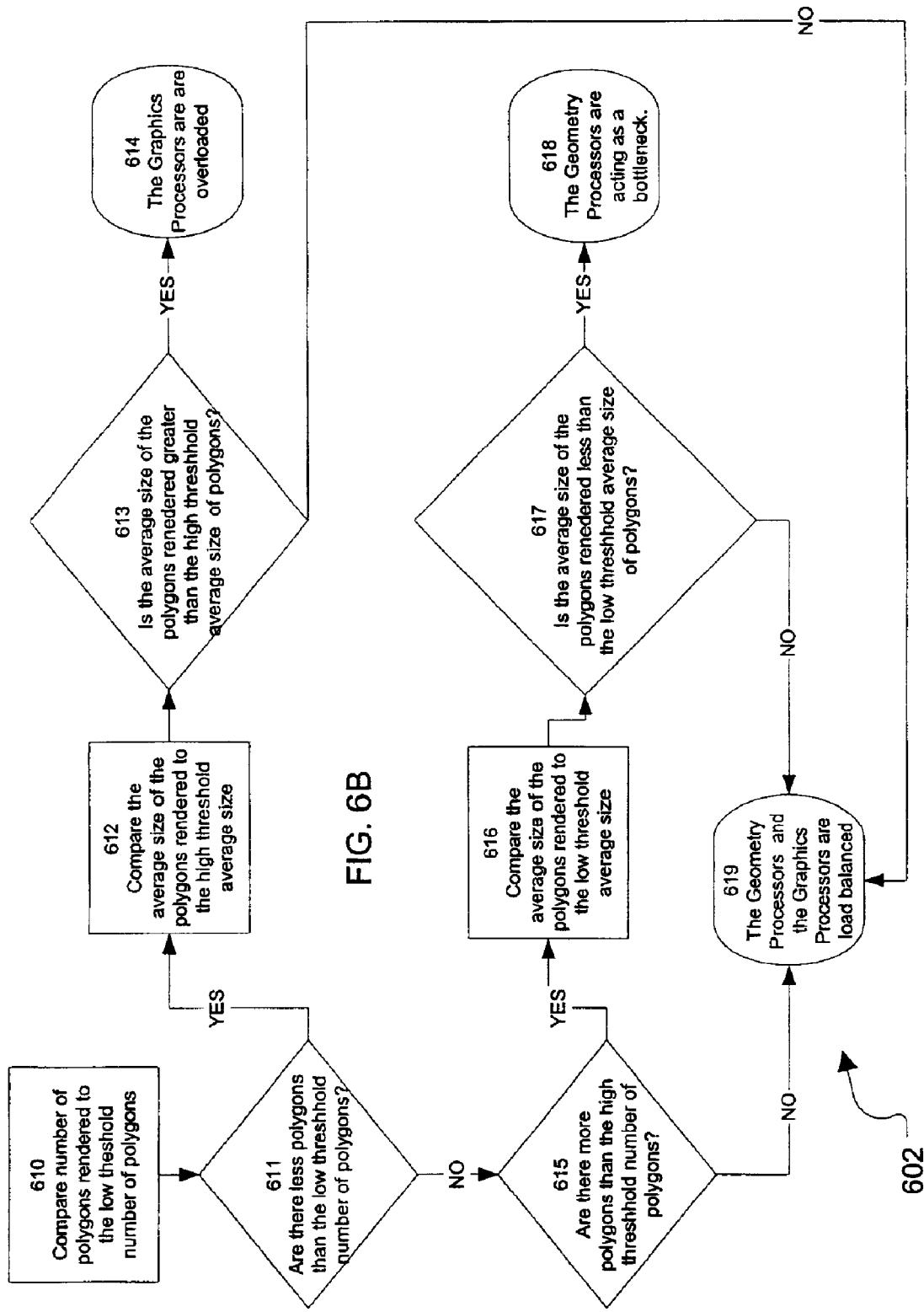

FIG. 6B show one embodiment of step 602. Step 610 compares the number of polygons rendered in a period of time to a low threshold number of polygons. This low threshold number of polygons may be determined by a number of different methods. In one embodiment, the low threshold number of polygons is determined during the programming of a graphics program by tuning. In another embodiment, it is determined by an algorithm, of which any number of implementations are possible. Of course, such an algorithm could also be tuned during programming. Step 611 queries the result of this comparison. If there are more polygons than the low threshold number of polygons, step 612 is implemented. Step 612 compares the average size of the polygons rendered in a period of time to a high threshold average size of the polygons. Again, such a high threshold average size may be determined either by tuning beforehand, or by an algorithm implemented in any one of a number of ways, which can also in and of itself be tuned during the programming of a graphics program. Step 613 queries the results of step 612. If step 613 finds that the average size of the polygon rendered is greater than a high threshold average size of the polygons, step 614 is implemented, indicating that the graphics processors are overloaded. Obviously, then step 603 is implemented (see FIG. 6A). However, if the result of step 611 is no, then step 615 is implemented. Step 615 determines whether there are more polygons than a high threshold number of polygons. If the answer is yes, step 616 is implemented, which compares the average size of the polygons rendered over a time period to a low threshold average size. Again, similar to the high threshold average polygon size, the low threshold average polygon size is determined beforehand during the programming of the computer graphics program by programmer tuning the program or during the running of the computer graphics program by an algorithm. Said algorithm can have one of many implementations, and can in and of itself be tuned during the initial programming of the graphics program. Step 617 queries the result of step 616. If the average size of the polygons rendered over a period of time is less than the low threshold average value of polygons, then step 617 is implemented, indicating that the geometry processors are overloaded. Then, obviously, step 606 is implemented (see FIG. 6A). If the result of the determination of step 615 is that there are not more polygons than the high threshold number of polygons, then step 619 is implemented indicating that the geometry processors and the graphics processors are load balanced. Again, as previously noted, then step 601 is again implemented (see FIG. 6A).

As noted, this is only one embodiments of many possible analyses performed by the rendering control processor 522 on the performance data. Other variables may be queried, and different threshold values may be applied. For example, data on the number of DRAM page breaks and the number of texture misses may both be collected in step 601. In step 602, a number of year end page breaks greater than a threshold level may be used as part of the test for an overload of the number of graphics processors 507 assigned to a graphics task. Similarly, the number of texture misses over a period of time can be compared to a threshold level as a method of testing whether the number of graphics processors 507 is computationally overloaded. In each case, you are testing if the number is greater than the threshold number. Again, the threshold number may be determined by tuning, by algorithm or by tuned algorithm.

There are situations not optimum to the application of configuration load balancing to graphics optimization. As noted above, the period of time over which performance data is collected must be long enough to collect a statistically significant amount of data. However, if the characteristics of the polygons, such as the number of polygons being rendered for an object and their average area or size, is rapidly changing, then the period of time must be reduced in order to achieve a feedback loop which changes the configuration of processors and buffers and channels quickly enough. However, the analysis of the performance data as in step 602, and the determination and reconfiguration performed in either steps 603, 604 and 605 or in steps 606, 607 and 608 require non-trivial amounts of time and computation. Therefore, in situations in which the frames being rendered have rapidly changing polygon characteristics, the associated lag due to computation and reconfiguration place a limit on how fast the feedback loop can be made. As a specific example, as seen with a car crash in a computer game, a shard of a shattered window that starts in a background but flies rapidly towards the foreground would result in a rapidly changing set of polygon characteristics for this graphics object. The graphics processing of such a graphics object would be more difficult using the configuration load balancing method. One way of addressing this issue is to have the period of time on which is collected be variable, and be algorithmically determined as well. This is as opposed to it being predetermined beforehand (by tuning during programming).

However, the above approach of statistical collection of data, analysis of said data, determination of a new configuration, and reconfiguration of the number of geometry processors and graphics processors, and of the channels and buffers associated with said processors, has an associated lag time which places a limit on the use of a variable period of time. An alternative approach is to predetermine a set of configurations which the analysis step 602 would be able to select from. This substantially reduces the computational load of determining the configuration of the number of geometry processors 501, the number of graphics processors 507, and the configuration channels and buffers 514. Thus, such a predetermined configuration approach to the configuration load balancing method allows for shorter lag time response in the feedback loop, and thus a much better ability to deal with graphics objects which have rapidly changing polygon characteristics.

Figures 7A, 7B:
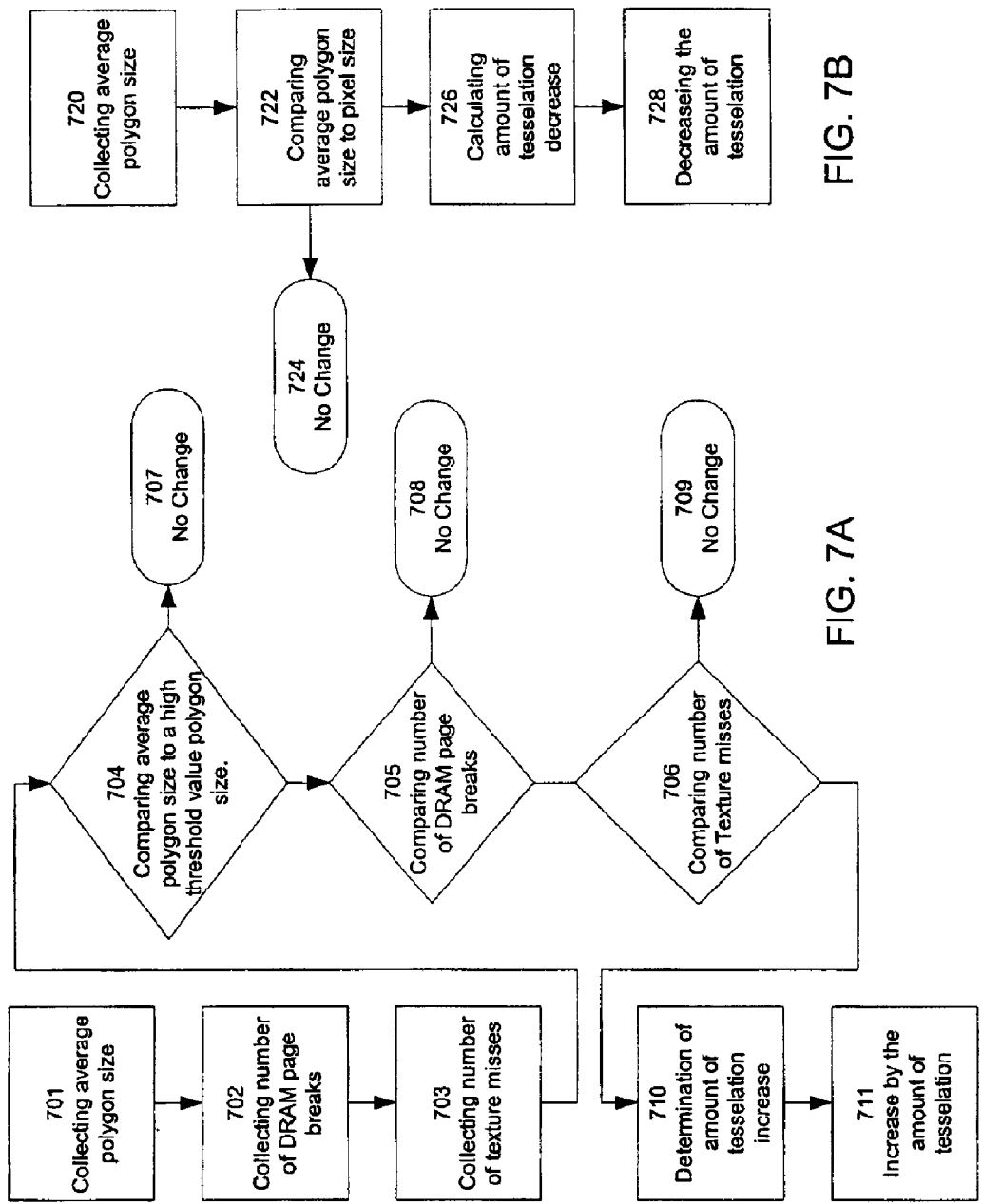
FIG. 7 is a flow chart of an alternative embodiment of the invention.

There are alternative methods to load balancing the number of geometry processors 501 and the number of graphics processors 507 to the methodology described above. One methodology involves tessellation. Tessellation is the process of converting a graphics object to be displayed into a set of polygons. Tessellation is usually performed within the number of geometry processors 501. The amount of tessellation may be either increased or decreased. Increasing the amount of tessellation increases the number of polygons to be rendered for a particular graphic object, and decreases the average size of the polygons to be rendered for a particular polygon. Decreasing the tessellation decreases the number of polygons to be rendered for rendering a particular graphics object, but increases the average size of the polygons to be rendered when rendering a particular graphics object. There are several situations when tessellation will be a particularly useful method for optimizing computer graphics. FIG. 7A shows step 701 the collecting of the average polygon size. Next is step 702, the collecting of the number of DRAM page breaks over a period of time. Next is step 703, the collecting of a number of texture misses over a period of time. Step 704 is comparing the average polygon size to a high threshold value polygon size. Step 705 compares the number of DRAM page breaks to a high threshold number of DRAM page breaks. Step 706 compares the number of texture misses to a high threshold number of texture misses. If for any of the tests 704, 705 and 706, the value over a period of time is less than the high threshold value, no change occurs in the amount of tessellation, as in steps 707, 708 and 709. However, if in every case, the value over a period of time is over the high threshold value, then step 710 occurs, which determines the amount of tessellation increase. The amount of tessellation increase in step 710 depends upon an algorithm which may vary in wide implementation. However, the increase in tessellation of step 711 will result in a small average polygon size during the next period of time, which will lead to a decrease in the number of page breaks and a decrease in the number of texture misses over the next period of time.

FIG. 7B shows the procedure for decreasing tessellation size. Note this is done for a different reason. If the tessellation of an object is so large that the resulting average size of the polygon is as small or smaller than the pixel size, the information within the polygon vertices will be lost. Thus, tessellation will occur, a great deal of vertex information will have been generated, but this information will not be used during the rendering, which is highly computationally inefficient. Thus, step 722 shows comparing the average polygon size over a period of time to the pixel size of a particular implementation of a graphics system. Step 720 collects the average polygon size over a period of time. Step 724 queries the result of step 722. If the polygon size is less than or equal to the pixel size, then the amount of tessellation decrease is calculated in step 726. If the polygon size is larger than the pixel size, then no change occurs in step 724. The amount of tessellation in geometry processors 501 for a graphics task is decreased in step 728. Note that a multiplier or scaler or the pixel value may be used to increase the pixel value by some amount to increase the margin of safety and avoiding the lost vertices information.

The configuration method of load balancing and the tessellation method of graphics optimization can be applied simultaneously, even when it would appear contradictory. For example, in the case where to geometry processors are sending results to one graphics processor, the geometry processor might be dealing with over 100,000 polygons. In this instance, the polygons may be too small to be resolved by the pixels. Thus, in this case, although it seems contrary, one would decrease the amount of tessellation to increase polygon size as per the tessellation method of FIG. 7B. However, this would be a small increase in average polygon size and a small decrease in the number of polygons to be rendered in a period of time. It would not likely affect the current configuration of cross-bar channels and buffers 514 yielding the two geometry engine—one graphics processor configuration. Similarly, in the situation where one geometry processor is sending its output to two graphics processors, the geometry processor may be dealing with one-to-ten polygons. In such a situation, it is of course not unexpected that the large polygons may cause an excessive page breaks and texture misses, which yields an increased computational load. Thus, application of the tessellation method of FIG. 7A would increase tessellation of the graphics object or objects to be displayed, which would increase the number of polygons and decrease the average size of those polygons in the graphics task. However, the application of the tessellation method of FIG. 7A would only, for example, increase the number of polygons to be displayed to 100 polygons. This change in the number of polygons to be rendered in a time period and the average size of those polygons is again small compared to the kinds of changes necessary to trigger a change in the two geometry processor—one graphics processor configuration by the configuration method of FIGS. 6A and 6B. Thus, the configuration method of load balancing and the tessellation approach to graphics optimization are not contradictory. The configuration method deals with much larger order of magnitude changes of polygon characteristics than the variable tessellation method.

FIG. 8 contains the same components as graphics processors apparatus 500. Like numbered elements are similar. Configurable communications channel and buffer 514 is shown in bare component parts. The split and combine cross-bar channel 808 connects the geometry processors 502, 504 and 506 to the DLFIFO buffers 810. Control processor 524 controls the geometry processors 502, 504 and 506 by geometry processor allocation communications channel 814. Control processor 524 controls the communications channel 808 by buffer allocation channel 816. Control processor 524 controls display list FIFO buffers 810 also by buffer allocation channel 816. Graphics processors 508, 510 and 512 are connected to one-to-one cross-bar channel 812 to DLFIFO buffers 810. However, they show more detail. Rendering control processor 522 collects the performance data from graphics processors 508, 510 and 512 and sends it by feedback channel 526 to control processor 524. Split and combined cross-bar channel 808 is reconfigurable such that a single geometry processor such as geometry processor 502 can have its output display list sent to two or more DLFIFO buffers 810. Alternatively, two or more geometry processors, such as geometry processor 502 and geometry processor 504 can have their display lists combined by the cross-bar channel to a single DLFIFO buffer 810. In contrast, one-to-one cross-bar channel 812 may not split or combine the resulting serialized display lists in DLFIFO buffer 810, but rather can only communicate the serialized display list of one DLFIFO buffer 810 with one graphics processor such as graphics processor 508. The one-to-one cross-bar channel will be an input/output ASIC, or applications specific integrated circuit. It will be controlled by a communications channel 818.

The performance data sent from the graphics processors 508, 510 and 512 depend on the architecture of the graphics processors. Graphics processors 508, 510 and 512, as shown, are similar to graphics processor 106, except for the addition of multipass controllers 820, 822, and 824. For example, graphics processor 508 is similar to graphics processor 108. Graphics processor 508 has an input buffer 826. Multipass controller 820 is connected to the input buffer 826. DDA 828 is connected to the multipass controller 820. A pixel processor 830 receives data from DDA 828. A texture buffer 832 and DRAM page buffer 834 are both in communication with pixel processor 830. A frame buffer 836 is in communication with texture buffer 832 and 834. Graphics processor 510 and 512 are likewise constructed.

Each of the components of the graphics processor 508 communicate control information to the rendering control processor 522. Input buffer 826 communicates the amount of data within it to rendering control processor 522. Multipass controller 820 communicates the number of passes to rendering control processor 522. The DDA 828 communicates the size of the polygon the DDA is drawing to rendering control processor 522. Note that, in many implementations, the set-up engine of the DDA 828 would communicate the size of the polygon to be rendered. The pixel processor 830 communicates the texture read time to rendering control processor 522. Finally, the frame buffer 836 communicates when a DRAM page break occurs to rendering control processor 522. Each of the like components in graphics processors 510 and 512 likewise communicate similar information to the rendering control processor 522. Rendering control processor 522 processes the information fed to it from graphics processors 508, 510, and 512 and generates feedback for control processor 524 as described for FIG. 5.

In operation, the buffer allocation communication channel 816 allows control processor 524 to designate areas of memory for the display lists generated by geometry processors to use as buffers. These buffers can be within a single memory or distributed among different memories. The communication channel 818 allows control processor 524 to utilize the cross-bar architecture of communication channel 812 to direct the results from the geometry processors 502, 504 and 506 to graphics processor 508, 510 and 512. The multipass controller 820 allows the same polygon to be rendered multiple times.

The above structure of graphics processing apparatus 800, and specifically the internal structure of graphics processors 508, 510 and 512 illustrate the kind of performance data which will be received by rendering control processor 522. Such performance data includes the amount of data within the input buffer, the number of passes made on a polygon by the multipass controller, the size of the polygon drawn by the digital differential analyzer, or DDA, whether a texture buffer miss occurs and whether a DRAM page buffer miss occurs. This information can be used to more accurately determine the computational load within the graphics processors. It also allows for alternative optimizations.

For example, while a small polygon is less likely to fall on the line determining a DRAM page break in the frame buffer, it may still do so. If the rendering control processor 522 receives page break information indicating many page breaks and average polygon size information indicating small polygons size, rendering control processor 522 can instruct the control processor 524 to "clip" the small polygon. In other words, the smaller portion of the small polygon that is on one DRAM page will not be rendered while the larger portion of the small polygon that is on the other DRAM page will be rendered. For a small polygon, the degradation of graphics quality is small compared to the advantage of computational efficiency.

A separate graphics processing optimization technique than clipping occurs under similar conditions. While clipping usually occurs with small polygon size combined with a large number of DRAM page breaks and texture misses are indicated, if the conditions include a particularly large number of small polygons and the small polygons are randomly or pseudo-randomly distributed about the frame buffer, a very large computational load is acquired. This is due to a vastly increased number of DRAM page breaks, otherwise or alternatively called DRAM page swaps. If a large number of polygons being displayed are distributed randomly in the frame buffer 830, pages of DRAM memory are constantly being swapped in and out, so despite any large bandwidth to the frame buffer 830, there will be substantial slow down. Again, implementing the concept of the feedback loop, one can address this issue by "tiling." This is essentially spatial serialization of the pages of the frame buffer. Rather than render the object to be rendered in an order dependent upon the three dimension object originally to be displayed, after the object is reduced to polygons, the polygons of a single frame are reordered to be processed in a sequential manner. For example, left to right and then up to down. To illustrate, consider rendering a graphical object like a tree. In usual operation of graphics apparatus 800, the polygons will be rendered in the order the occur in the tree. After spatial serialization, the frame will be rendered page by page, independent of polygon order of the tree object. Thus tiling, while adding some computational time for reordering, results under the specific conditions tested for, a substantial increase in computational efficiency.

Figure 1:
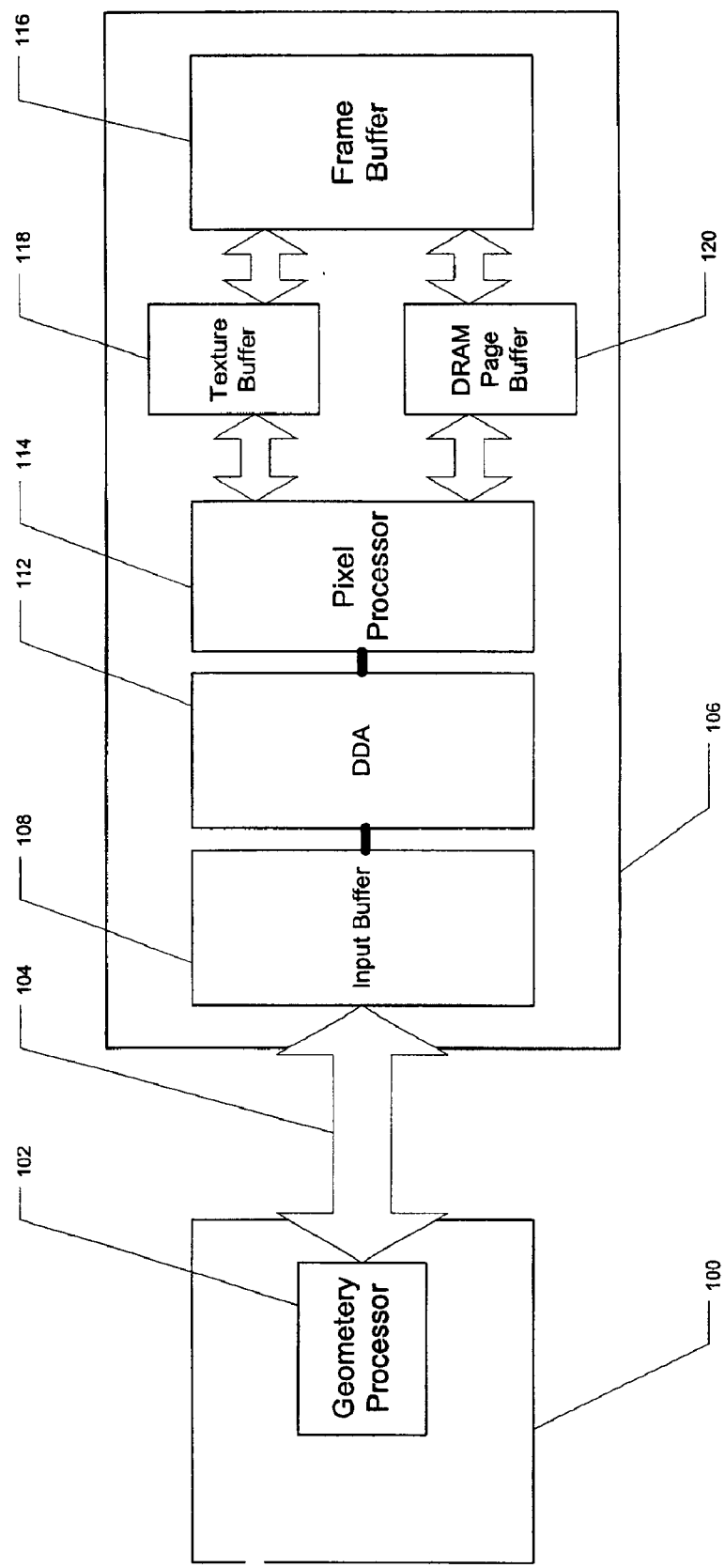
FIG. 1 is a diagram of a prior art graphics processing apparatus.
Figure 2:
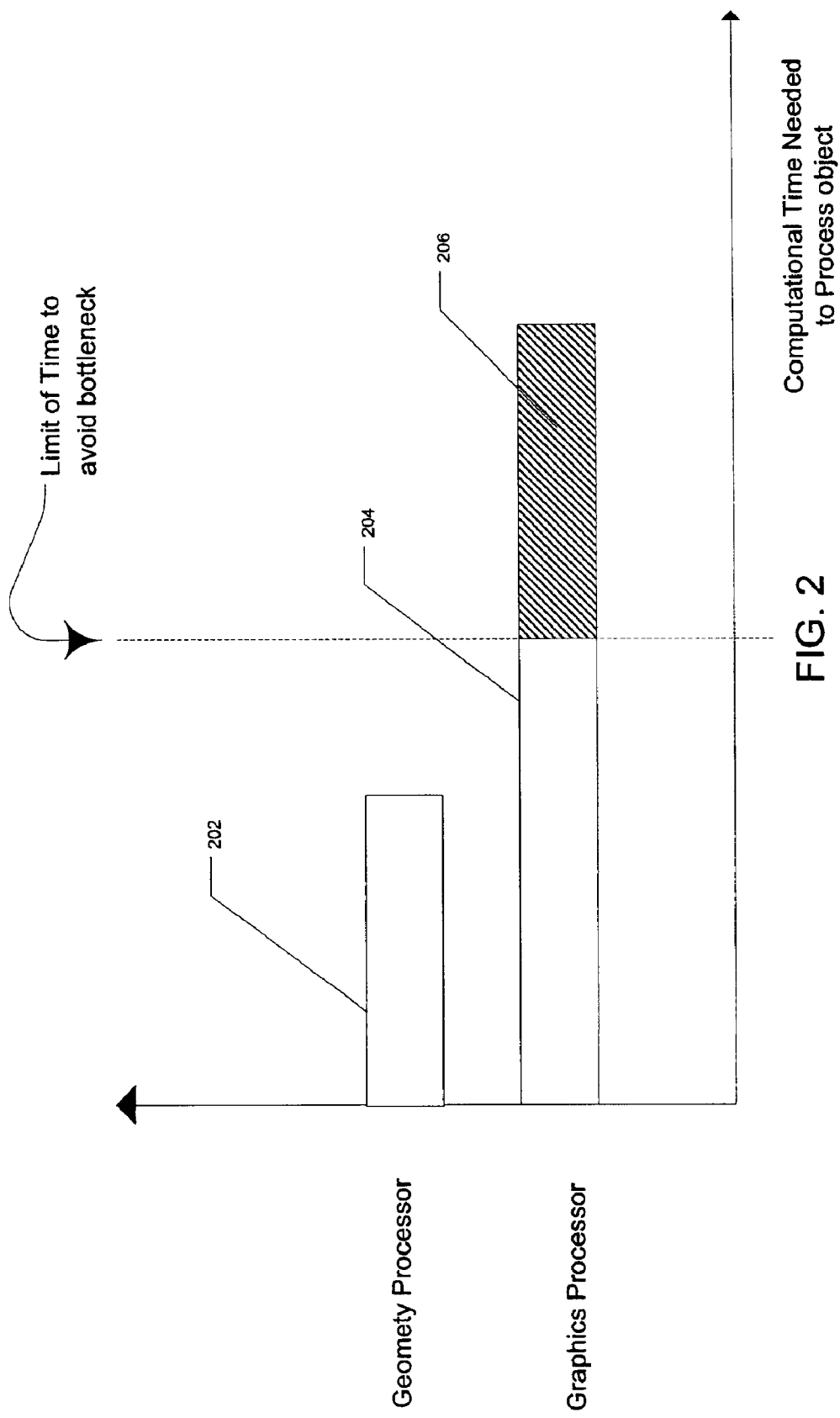
FIG. 2 is a graph of the computational load within the prior art graphics processing apparatus under one situation.

The multipass controller 820 is a special component not shown originally in FIG. 1. It takes advantage of large bandwidths between the frame buffer 836 and the pixel processor 830, and relatively short overall pipelines in the graphics processor 508 to allow multipass rendering. For example, a first rendering pass will draw and fill a polygon, the second will texture it and a third will shade it. One, two or three passes may be used. This multipass controller 820 allows a certain kind of predictive load balancing. This predictive load balancing is dependent upon the large amount of information the multipass unit must have. This large amount of information includes at least the percentage of the input buffer 826 that is filled, the number of passes that have been made by multipass controller 820, the percentage of rendering of the current polygon that has been completed, and the number of polygons in the buffer of DLFIFO buffers 810 that is feeding serialized display lists to graphics processor 508. This information will allow either the rendering control processor 522 or the control processor 524 to estimate when more data will be need for the input buffer and thus trigger the geometry processor to start or begin transforming more objects into display lists of primitive polygons, or to allocate more geometry processors to an already ongoing graphics task. While the nature of the information used to perform this predictive mode balancing is different than the nature of the information used in configuration load balancing and tessellation optimization, it still allows for graphics processing optimization.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of optimizing the processing of graphics comprising the steps of:
    a) assigning a first number of geometry processors to a graphics task and a second number of graphics processors to a graphics task;
    b) collecting performance data from the second number of graphics processors over a period of time;
    c) analyzing the collected performance data with an algorithm;
    d) changing at least one of the first number of geometry processors assigned to the particular computer graphics task and the second number of graphics processors assigned to a particular computer graphics task depending on the analyzed results of the collected performance data.

2. The method of claim 1, wherein said first number of geometry processors transform object data into vertex data of polygons, and said second number of graphics processors render said polygons into a buffer memory, said step of collecting performance data over a period of time further includes:
- a) counting the number of polygons that are rendered; and
- b) calculating the average size of the polygons that are rendered.

3. The method of claim 2, wherein rendered polygons include a plurality of pixels, said step of calculating the average size of the rendered polygons includes counting the number of pixels rendered and dividing by the number of polygons rendered.

4. The method of claim 3, wherein said step of analyzing the collected performance data includes:
- a) finding the number of polygons less than a low threshold number of polygons;
- b) finding the average size of polygons greater than a high threshold average size; and
- c) determining to either
  - i) decrease the first number of geometry processors assigned to graphics tasks, or
  - ii) increase the second number of graphics processors assigned to graphics tasks, or
  - iii) decrease the first number of geometry processors and increase the second number of graphics processors.

5. The method of claim 4, wherein changing at least one of the first number of geometry processors and the second number of graphics processors includes:
- a) decreasing the first number of geometry processors, or
- b) increasing the second number of graphics processors, or
- c) decreasing the first number of geometry processors and increasing the second number of graphics processors.

6. The method of claim 3, wherein analyzing the collected performance data includes:
- a) finding the number of polygons greater than a high threshold number of polygons;
- b) finding the average size of the polygons to be less than a small threshold average size; and
- c) determining to either
  - i) increase the first number of geometry processors, or
  - ii) decrease the second number of graphics processors, or
  - iii) increase the first number of geometry processors and decrease the second number of graphics processors.

7. The method of claim 6, wherein changing at least one of the first number of geometry processors and the second number of graphics processors includes:
- a) increasing the first number of geometry processors, or
- b) decreasing the second number of graphics processors, or
- c) increasing the first number of geometry processors and decreasing the second number of graphics processors.

8. The method of claim 1, wherein the period of time comprises approximately 10,000 clock cycles.

9. The method of claim 1, wherein changing at least one of the first number of geometry processors assigned to a graphics task and the second number of graphics processors assigned to a graphics task includes:
- a) calculating a new configuration for a first cross-bar channel from among any arbitrary configuration,
- b) calculating a new configuration for a set of buffers from among any arbitrary configuration,
- c) calculating a new configuration for a second cross-bar channel from among any arbitrary configuration,
- d) reconfiguring the first cross-bar channel to the new configuration,
- e) reconfiguring the set of buffers to a new configuration, and
- f) reconfiguring the second cross-bar channel to the new configuration.

10. The method of claim 1, further comprising:
- a) providing a set of buffers;
- b) providing a first cross-bar channel connecting the first number of geometry processors to the set of buffers; and
- c) providing a second cross-bar channel connecting the second number of graphics processors to the set of buffers.

11. The method of claim 10, wherein changing at least one of the first number of geometry processors assigned to a graphics task and the second number of graphics processors assigned to a graphics task includes:
- a) selecting a new configuration for the first cross-bar channel, the set of buffers, and the second cross-bar channel from among a pre-determined set of configurations; and
- b) configuring the first cross-bar channel, the set of buffers, and the second cross-bar channel to the selected pre-determined configuration.

12. A method of optimizing the processing of graphics comprising the steps of:
- a) assigning a first number of geometry processors to a graphics task and a second number of graphics processors to a graphics task, said first number of geometry processors transferring object data into vertex data of polygons, said second number of graphics processors rendering said polygons into a buffer memory, said polygons comprising a plurality of pixels;
- b) collecting performance data from the second number of graphics processors over a period of time;
- c) analyzing the collected performance data with an algorithm; and
- d) increasing the number of polygons and decreasing the average size of polygons generated by the first number of geometry processors by increasing the tessellation of the objects to be rendered depending on the results of analyzing the collected performance data.

13. The method of claim 12, wherein said step of collecting performance data includes:
- a) counting the number of polygons rendered and the number of pixels rendered;
- b) calculating the average polygon size;
- c) collecting the number of texture misses; and
- d) collecting the number of DRAM Page Breaks.

14. The method of claim 13, wherein calculating the average size of the polygons that are rendered includes collecting the number of pixels rendered and dividing by the number of polygons rendered.

15. A method of optimizing the processing of graphics comprising the steps of:
- a) assigning a first number of geometry processors to a graphics task and a second number of graphics processors to a graphics task, said first number of geometry processors transforming object data into vertex data of polygons, said second number of graphics processors rendering said polygons into a buffer memory, said polygons comprising a plurality of pixels;

b) collecting performance data from the second number of graphics processors over a period of time;

c) analyzing the collected performance data with an algorithm; and d) decreasing the number of polygons and increasing the average size of polygons generated by the first number of geometry processors by decreasing the tessellation of the objects to be generated depending on the results of analyzing the collected performance data.

16. The method of claim 15, wherein collecting performance data includes collecting average polygon size.

17. The method of claim 15, wherein the collecting of average polygon size includes a) counting the number of polygons rendered and a number of pixels rendered;

b) collecting the number of pixels rendered; and c) dividing the number of polygons rendered by the number of pixels rendered.

18. The method of claim 16, wherein the step of analyzing the performance data includes checking if the average polygon size is smaller than a specified size.

19. The method of claim 16, wherein the step of analyzing the performance data includes checking if the average polygon size is smaller than the size of a pixel.

20. A method of optimizing the processing of graphics comprising the steps of:

a) assigning a first number of geometry processors to a graphics task and a second number of graphics processors to a graphics task, said graphics task including creating polygons having a plurality of pixels;

b) collecting performance data from the second number of graphics processors over a period of time;

c) analyzing the collected performance data with an algorithm;

d) changing at least one of the first number of geometry processors assigned to the graphics task, the second number of graphics processors assigned to the graphics task, and the amount of tessellation applied to said polygons by the first number of geometry processors.

21. A method of optimizing the processing of graphics comprising the steps of:

a) assigning a first number of geometry processors to a graphics task and a second number of graphics processors to graphics task, said graphics task including creating polygons;

b) collecting performance data from the second number of graphics processors over a period of time;

c) analyzing the collected performance data with an algorithm;

d) spatially sorting the polygons being processed by the first number of geometry processors before sending the polygon data to be rendered by the second number of graphics processors.

22. The method of claim 20, wherein said step of collecting performance data includes collecting the number of page breaks, the number of polygons, and the average polygon size.

23. The method of claim 21, further comprising the step of determining the average polygon size by comparing the number of polygons rendered to the number of pixels rendered.

24. The method of claim 21, wherein said step of analyzing the collected performance data with an algorithm includes checking for:

a) a number of polygons over a specified number;

b) an average size less than a specified size; and c) a number of DRAM page breaks over a specified number of DRAM page breaks.

25. A method of processing graphics data in a computer system having graphics processing circuitry, said method comprising:

a) utilizing at least one geometry processor to perform at least a portion of a graphics task;

b) utilizing at least one graphics processor to perform at least another portion of said graphics task;

c) determining whether said at least one geometry processor and said graphics processor are being efficiently utilized; and d) if necessary, selectively assigning or unassigning one or more of said at least one geometry and graphics processors to improve the efficiency of the graphics processing circuitry in performing said graphics task.

26. The method of claim 25 wherein said step of utilizing at least one geometry processor to perform at least a portion of a graphics task comprises performing 3-D to 2-D conversion of an object into vertex data of polygons.

27. The method of claim 26 wherein said step of utilizing at least one graphics processor to perform at least another portion of said graphics task comprises rendering of said polygon vertex data into a buffer memory.

28. The method of claim 27 wherein said polygons comprise the plurality of pixels, said step of determining whether said at least one geometry processor and said at least one graphics processor are being efficiently utilized comprises:

a) calculating the number of polygons that are rendered; and b) calculating the average size of the polygons that are rendered.

29. The method of claim 28 wherein said step of calculating the average size of the polygons that are rendered includes counting the number of pixels rendered and dividing by the number of polygons rendered.

30. The method of claim 29 further comprising providing a set of buffers having a configuration, providing a first cross-bar channel having a configuration connecting said plurality of geometry processors to said set of buffers, and providing a second cross-bar channel having a configuration connecting said plurality of graphics processors to said set of buffers.

31. The method of claim 30 wherein said step of selectively assigning or unassigning one or more of said geometry and graphics processors comprises:

a) calculating a new configuration for said first cross-bar channel;

b) calculating a new configuration for said set of buffers;

c) calculating a new configuration for said second cross-bar channel;

d) reconfiguring said first cross-bar channel to said new configuration;

e) reconfiguring said set of buffers to a new configuration; and f) reconfiguring said second cross-bar channel to said new configuration.

32. A computer system having graphics processing circuitry for processing graphics data, said system comprising:

a) at least one geometry processor for at least partially performing at least a portion of a graphics task;

b) at least one graphics processor for at least partially performing at least another portion of said graphics task;

c) a communication channel permitting communication between said at least one geometry and graphics processors; and d) a control processor communicating with said geometry and graphics processors through said communication channel, said control processor determining whether said at least one geometry and graphics processors are being efficiently utilized and, if necessary, selectively assigning or unassigning one or more of said at least one geometry and graphics processors to improve the efficiency of said graphics processing circuitry in performing said graphics task.

33. The computer system of claim 32 wherein said at least one geometry processor comprises a plurality of geometry processors, and said at least one graphics processor comprises a plurality of graphics processors.

34. The computer system of claim 33 wherein said plurality of geometry processors perform 3-D to 2-D conversion of an object into vertex data of polygons.

35. The computer system of claim 34 wherein said plurality of graphics processors render said polygons into a buffer memory, said polygons comprising a plurality of pixels.

36. The computer system of claim 35 wherein said communication channel includes:

a) a first channel having a cross-bar architecture;

b) at least one buffer memory connected to receive data from said plurality of geometry processors through said first channel; and c) a second channel having a one-to-one cross-bar architecture arranged to permit communication between said plurality of graphics processors and said at least one buffer memory.

37. The computer system of claim 36 wherein said communication channel facilitates communication of performance data between said plurality of graphics processors and said control processor.

* * * * *